United States Patent [19]

Strader

[11] 4,327,791
[45] May 4, 1982

[54] SAFETY TIRE AND WHEEL ASSEMBLY

[75] Inventor: Don S. Strader, Lansing, Mich.

[73] Assignee: Motor Wheel Corporation, Lansing, Mich.

[21] Appl. No.: 192,337

[22] Filed: Sep. 29, 1980

[51] Int. Cl.³ .............................................. B60C 17/04
[52] U.S. Cl. .............................. 152/158; 152/330 RF; 152/401
[58] Field of Search ............. 152/158, 330 RF, 330 L, 152/401

[56] References Cited

U.S. PATENT DOCUMENTS

| | | | |
|---|---|---|---|
| 2,040,645 | 5/1936 | Dickinson | 152/158 |
| 3,049,162 | 8/1962 | Rosenbaum et al. | 152/158 |
| 3,180,391 | 4/1965 | Lindley | 152/158 |
| 3,420,288 | 1/1969 | Unruh | 152/158 |
| 3,519,053 | 7/1970 | Lindley | 152/158 |
| 3,635,273 | 1/1972 | Patacell | 152/158 |
| 3,814,159 | 6/1974 | Lindley | 152/158 |
| 3,872,907 | 3/1975 | Curtiss, Jr. et al. | 152/158 |
| 3,889,734 | 6/1975 | Owsen | 152/158 |
| 4,046,182 | 9/1977 | Farnsworth | 152/158 |
| 4,157,726 | 6/1979 | Brewer | 152/330 RF |
| 4,173,243 | 11/1979 | Wilde et al. | 152/158 |
| 4,258,767 | 3/1981 | Wilde | 152/330 RF |

FOREIGN PATENT DOCUMENTS 7900612 9/1979 United Kingdom ................ 152/158
126029 3/1960 U.S.S.R. .

Primary Examiner—Edward C. Kimlin
Assistant Examiner—Lois E. Boland
Attorney, Agent, or Firm—Barnes, Kisselle, Raisch & Choate

[57] ABSTRACT

A safety tire and wheel assembly for pneumatic tires which includes a safety insert having an inner portion extending around the wheel rim base for clamping the tire bead toes against the opposing rim flanges and an outer portion projecting radially into the tire cavity. A band of resilient material such as rubber is carried by a circumferential array of bearing elements in a depression formed on the outer surface of the core outer portion for supporting the tire tread with respect to the wheel rim upon loss of tire inflation pressure. The wheel includes a two-piece rim comprising a first rim portion welded to a wheel disc and a demountable rim portion mounted by the circumferential array of clamps to the fixed rim portion. A sealing ring is disposed between the rim portions for sealing the tire cavity for tubeless operation.

4 Claims, 3 Drawing Figures

SAFETY TIRE AND WHEEL ASSEMBLY

The present invention is directed to safety tire and wheel assemblies for pneumatic tires of a type adapted for continued operation upon loss of air pressure in the tire, and more particularly to assemblies of the described type which include a safety insert device disposed internally of the tire for supporting the tire tread in the deflated condition.

In safety tire and wheel assemblies which include inserts of the described type, the insert conventionally comprises a base portion disposed adjacent the wheel rim and a second portion projecting radially from the rim into the tire cavity or chamber. Upon loss of air pressure in the chamber, the tire tread collapses against the second portion of the insert such that the insert supports the tire tread with respect to the rim for continued operation of the vehicle. Friction due to relative motion between the tire tread and the tread-supporting portion of the safety insert often causes overheating and destruction of the insert during continued operation, a problem which has been alleviated to some extent, but not entirely overcome, by disposition of solid or liquid lubricant along the tread-supporting surface of the insert. A goal in the vehicle industry has been to provide a safety tire and wheel assembly which will operate at a vehicle speed of fifty miles per hour over a distance of fifty miles following loss of tire pressure without destruction of the tire or wheel. These specifications have not been well met by the safety assemblies previously proposed.

An object of the present invention is to provide a safety tire and wheel assembly which is adapted for operation at a vehicle speed of at least fifty miles per hour for a distance of at least fifty miles following loss of tire pressure. A further and more specific object of the invention is to provide a safety tire and wheel assembly which includes a safety insert specifically designed for reduced frictional heating, and is therefore adapted to operate to the speed and distance specifications previously mentioned.

A further object of the invention is to provide a safety tire and wheel assembly which is particularly well adapted for special purpose vehicles such as military vehicles.

Another object of the invention is to provide a safety insert for a pneumatic tire and wheel assembly which insert is rugged in operation, and yet which is light in weight and does not substantially alter the static and dynamic wheel and tire balance characteristics.

The invention, together with additional objects, features and advantages thereof, will be best understood from the following description, the appended claims and the accompanying drawings in which:

Figure 1:
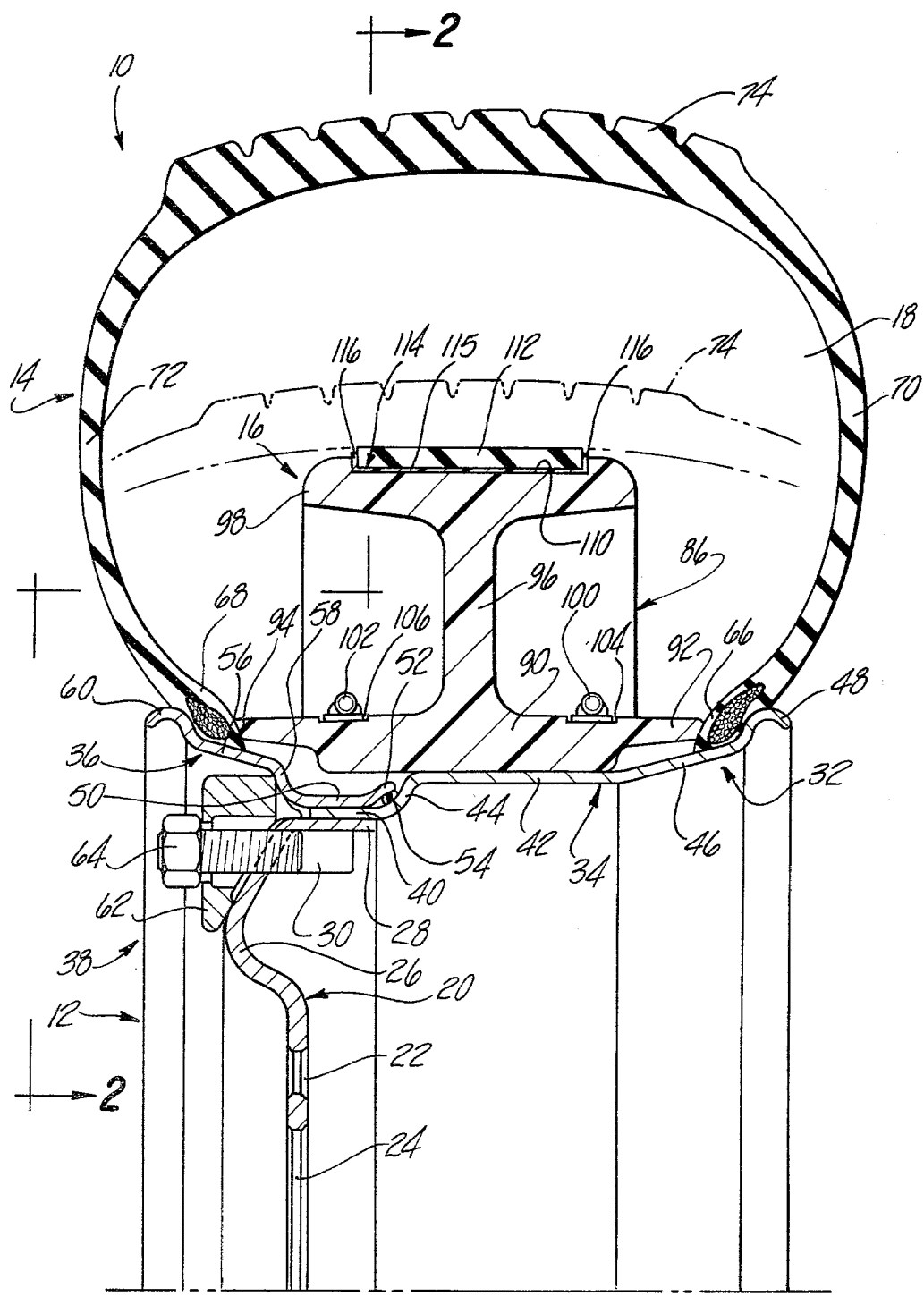
FIG. 1 is a sectional view of a presently preferred embodiment of the safety tire wheel assembly provided by the invention taken in a radial plane substantially along the line 1—1 in FIG. 2.

Referring to the drawings, a presently preferred embodiment of a safety tire and wheel assembly 10 in accordance with the invention comprises a multiple-piece vehicle wheel 12, a pneumatic tubeless tire 14 and a safety insert device 16 disposed within the air cavity or chamber 18 defined by the annular carcass of tire 14 and wheel 12. The specific wheel 12 shown in the drawings is particularly useful for military vehicles and comprises a steel disc 20 having a central portion including a circular array of bolt holes 22 and a hub opening 24 adapted for mounting the wheel to a vehicle spindle or the like (not shown). As best seen in FIG. 1, disc 20 extends from the circle of bolt holes 22 angularly outwardly to a hat or crown 26 and then angularly inwardly to an axial disc flange 28. (It will be appreciated that directional adjectives such as "inward" and "outward" are taken with reference to preferred orientation of the wheel as mounted on a vehicle). A plurality of studs 30 are welded in a circumferential array internally of flange 28 and extend axially outwardly through corresponding disc openings in a direction parallel to the axis of disc 20. Wheel 12 further includes a two-piece wheel rim 32 comprising a first piece or segment 34 (FIG. 1) externally welded to disc flange 28 and extending axially inwardly therefrom. A second rim piece or segment 36 is removably mounted to rim segment 34 by a circumferential array of clamping assemblies generally indicated at 38.

Rim segment 34 is generally stepped as viewed in radial cross section (FIG. 1) having an innermost portion 40 in the form of a band welded as previously described to disc flange 28. A second portion 42 of rim segment 34 is disposed radially outwardly of band 40 to form a rim base and is coupled to band 40 by the angulated shoulder 44. A conical bead seat 46 extends from rim base 42 and terminates in an inboard bead retaining flange 48. Removable rim segment 36 includes a circumferential band portion 50 slidably received over band 40 and having an angulated lip 52 projecting inwardly therefrom to capture against shoulder 44 a circumferentially continuous sealing ring 54 of resilient construction. A conical bead seat 56 is coupled to band 50 by the shoulder 58 and terminates in an outboard bead retaining flange 60.

Each clamp assembly 38 comprises a wedge 62 loosely received over a corresponding stud 30, and a nut 64 threaded onto the end of each stud 30 for clamping wedge 62 tightly against the angulated outer portion of disc 20 between hat 26 and flange 28. Each wedge 62 is thus forced radially outwardly into engagement with shoulder 58 in demountable rim segment 36 so as to mount segment 36 tightly to disc 20, and also to force segment 36 axially inwardly to compress sealing ring 54. A valve stem 76 is mounted by the nut 78, washer 80 and grommet 82 (FIGS. 2 and 3) externally of rim base 42, and projects forwardly through a corresponding opening 84 in disc 20. Tire 14 (FIG. 1) includes a pair of axially spaced circumferentially continuous bead toes 66,68 carried on rim bead seats 46,56 against corresponding bead retaining flanges 48,60. The tire side walls 70,72 extend from corresponding bead toes 66,68 to a radially facing tire tread 74. The tire 14 illustrated in the drawings is of conventional construction.

Safety insert device 16 comprises a two-piece core 86,88 (FIG. 2) each extending over an arc of 180°. Core 86, which is identical to core 88, and as best seen in FIG. 1, is generally I-shaped in radial cross section and comprises a first portion 90 forming the base of the I-shaped cross section extending axially and circumferentially along rim base 42. Axially directed circumferential lips 92,94 are formed at the edges of base 90 for engaging respective tire bead toes 66,68 and holding the same against corresponding rim flanges 48,60. A second portion 96 of core 86 forms the central leg of the I-shaped cross section and extends radially outwardly from the axial center of base 90 into cavity 18. Leg 96 terminates within cavity 18 in a cylindrical ledge 98 which forms the head of the I-shaped core cross section. Head 98, leg 96 and base 90 are formed integrally of rugged lightweight material such as aluminum or fiber-reinforced resin. A pair of hose clamps 100,102 are disposed in corresponding grooves 104,106 formed in the outer surfaces of core base 90 for clamping core segments 86,88 (FIG. 2) into an end abutting, circumferentially rigid structure. A radially inwardly facing shoulder 108 (FIGS. 2 and 3) is formed at one circumferential end of base 90, and is received over grommet 82 and valve stem 76 for permitting entry of inflation air, such air passing into cavity 18 between opposing ends of core segments 86,88.

Figure 2:
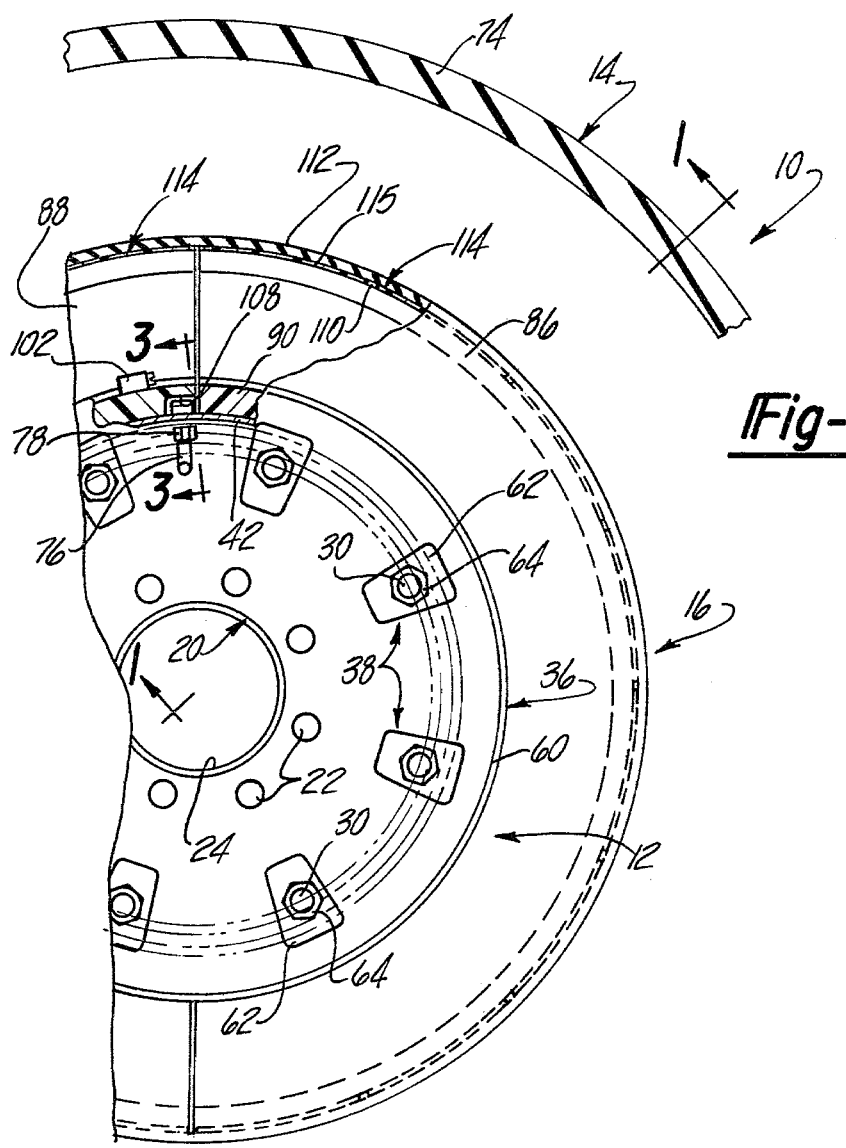
FIG. 2 is a fragmentary, partially sectional and partially elevational view of the tire and wheel assembly as viewed substantially along the line 2—2 in FIG. 1.
Figure 3:
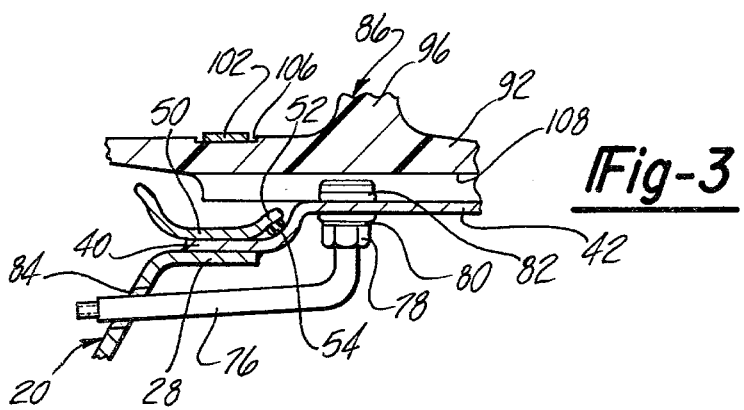
FIG. 3 is a sectional view taken along the line 3—3 of FIG. 2.

A circumferentially extending external groove or depression 110 (FIG. 1) is formed centrally of ledge 98 in the radially outwardly directed surface thereof. A circumferentially continuous band of resilient material such as rubber is rotatably and slidably mounted in depression 110, and is spaced from the opposing side and bottom surfaces of depression 110 by a plurality of circumferentially spaced bearing elements 114 (FIGS. 1 and 2). As best seen in FIG. 1, bearing elements 114 are generally U-shaped in radial cross section, having a flat bottom wall 115 which slidably engages the opposing bottom wall of depression 110, and upstanding side walls 116 which cooperate with opposing side walls of depression 110 for restraining elements 114 and band 112 against axial movement with respect to core 16. Band 112 is rectangular in cross section, as best seen in FIG. 1, and has a dimension in the radial direction which is greater than the corresponding dimension of insert side walls 116 so as to project radially outwardly from inserts 114 and ledge 98. Bearing elements 114 are adhered to band 112 and may be formed of phenolic resin construction, for example. Most preferably, the bearing surfaces of depression 110 engaged by bearing elements 114 are coated with a solid lubricant such as molybdenum disulfide.

In assembly, core segments 86,88 are first placed within cavity 18 of tire 14 and then clamped circumferentially by hose clamps 100,102. Band 112 with bearing elements 114 carried thereon is then fitted over the assembled core segments 86,88, the segmented bearing elements permitting limited circumferentially resilient expansion of band 112 over ledge 98. The assembled tire 14 and insert device 16 are then placed axially over rim segment 32, and sealing ring 54 and rim segment 36 are then assembled to rim segment 32 as previously described. In such assembly, base 90 of each core segment 86,88 is compressed between bead toes 66,68. The inside diameter of clamped core segments 86,88 is preferably close to the outside diameter of rim base 42. Tire 14 may then be inflated via valve stem 76 in the usual manner such that the inner surface of tread 74 is normally spaced radially outwardly of device 16 as shown in FIG. 1.

In operation, and upon loss of air pressure in tire 14, the portion of the tire tread 74 which engages the road surface collapses against core 16 (phantom in FIG. 1), specifically against that portion of band 112 which projects radially from ledge 98. The vehicle load is thus carried by safety insert device 16 through rim base 42 and disc 20. However, bead toes 66,68 remain in clamped engagement with corresponding rim flanges 48,60 so as to transfer drive and brake torque to the tire tread through tire side walls 70,72. During continued operation in the deflated condition, relative movement between tire tread 74 and core 16 results in sliding movement of band 112 and bearing elements 114 with respect to the bearing surfaces of depression 110. The structure so described substantially reduces the heating problem characteristic of prior art safety insert devices as previously described. The safety tire and wheel assembly 10 may be driven for a distance of fifty miles at a vehicle speed of fifty miles per hour without damage to either tire 14 or wheel 12. Due to continued clamping engagement of the tire beads with the rim flanges being insured by the safety core 16, the usual run-flat problem of tire demounting due to deflation is also overcome.

I claim:

1. A safety tire and wheel assembly comprising a vehicle wheel including a wheel rim having axially spaced bead flanges and a rim base; a tire having axially spaced bead toes and a circumferential tire tread; and a safety support means comprising core means including a first portion extending circumferentially around said rim base and having axially spaced side edges clamping said bead toes against said bead flanges such that said tire tread is spaced radially outwardly of said rim base to define a tire cavity, a second portion integral with said first portion and extending radially outwardly into said cavity, said second portion terminating radially inwardly of said tire tread in a circumferential support ledge including a circumferential depression on said ledge providing a radially outwardly directed bearing surface, said depression having axially opposed side walls and a radially outwardly directed base wall, a circumferentially continuous band of resilient construction, and bearing means comprising a plurality of circumferentially segmented bearing elements carried by said band and slidably mounting said band on said bearing surface in said depression with said bearing means engaging said side walls for preventing axial displacement of said band with respect to said core means and engaging said base wall for slidably supporting said band with respect to said core means, said band extending radially outwardly from said ledge and being adapted to support said tire tread in operation of said assembly upon loss of air pressure in said cavity, said band and segmented bearing elements being radially retained in said depression by said circumferentially continuous resilient band, said band being adapted for resilient circumferential expansion for assembly and disassembly of said band and bearing elements onto said ledge.

2. The safety tire and wheel assembly set forth in claim 1 wherein said core means is substantially I-shaped in radial cross section, with said first portion comprising a base of said I-shaped cross section extending axially and circumferentially along said rim base, said second portion comprising a leg integrally radiating centrally of said base, and said ledge comprising a head of said I-shaped cross section integrally and symmetrically projecting axially from said leg.

3. The safety tire and wheel assembly set forth in claim 2 wherein said core means comprises a plurality of circumferentially segmented core segments, and wherein said assembly further comprises means circumferentially clamping said segments into a rigid assembly.

4. The safety tire and wheel assembly set forth in claims 2, 3 or 1 wherein said wheel comprises a wheel disc adapted to be removably mounted to a wheel hub or vehicular support for rotation therewith, and said wheel rim comprises a two-piece rim comprising a first rim portion welded to the outer periphery of said wheel disc and extending generally axially inboard therefrom and terminating in an inboard one of said bead flanges and a second rim portion demountably secured in telescopic axially overlapping relationship to said first rim portion and extending generally axially outboard therefrom and terminating in an outboard one of said bead flanges, a circumferential array of clamps removably secured by associated fastening means to said wheel disc and disposed in clamping relationship with said second rim portion, and a sealing ring disposed between the telescopically overlapped portions of said first and second rim portions in air sealing engagement therewith.

* * * * *